(No Model.)
W. W. ROBINSON.
HARROW.
No. 343,527. Patented June 8, 1886.
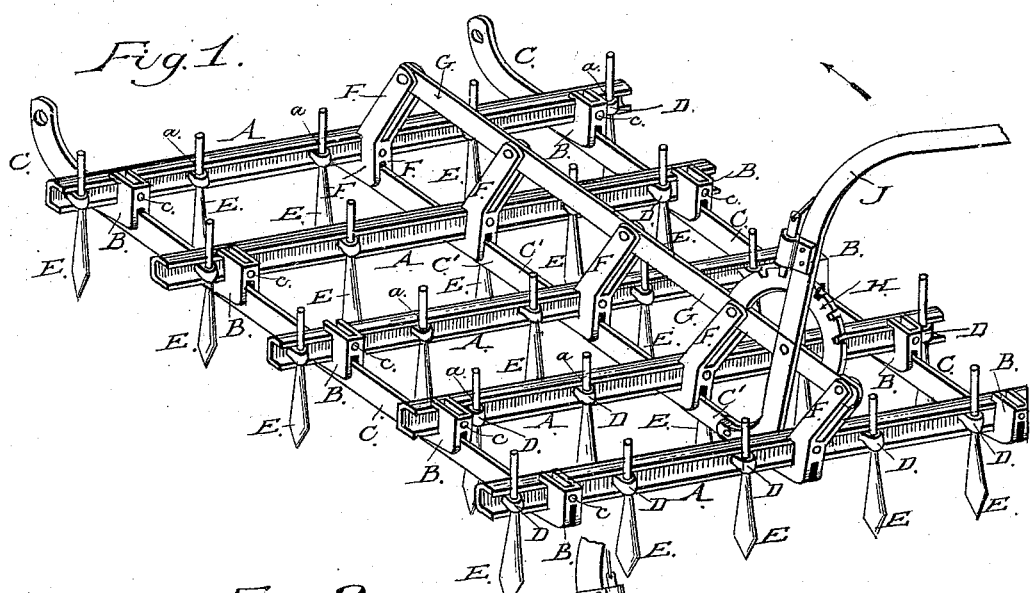
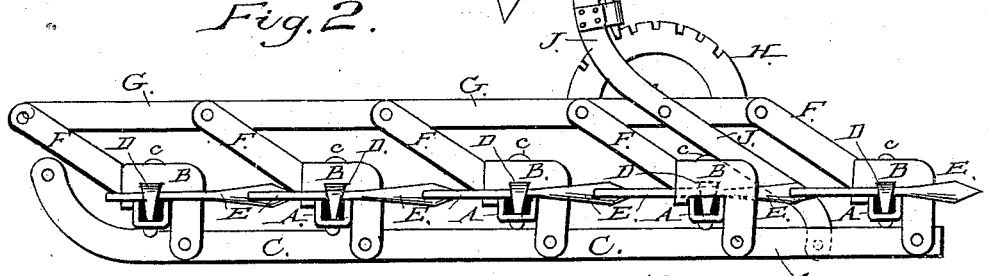
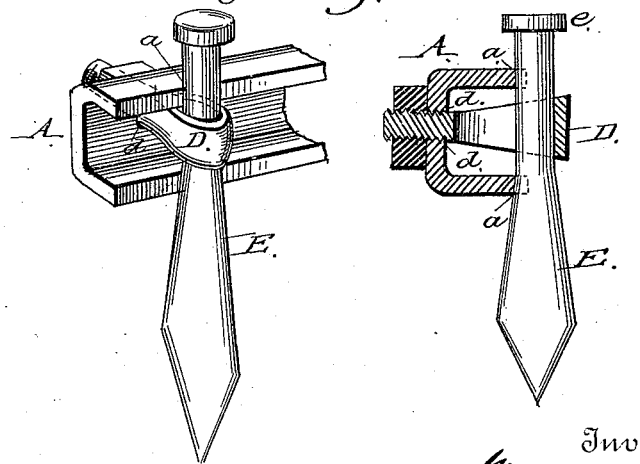
Witnesses
T. W. Fowler
H. B. Applewhaite
Inventor
Wm W. Robinson
By his Attorneys
A. H. Evans & Co

UNITED STATES PATENT OFFICE.

WILLIAM W. ROBINSON, OF ODEBOLT, ASSIGNOR TO E. A. KING AND MARY M. ROBINSON, BOTH OF IDA GROVE, IOWA.

HARROW.

SPECIFICATION forming part of Letters Patent No. 343,527, dated June 8, 1886.

Application filed February 18, 1886. Serial No. 192,331. (No model.)

*To all whom it may concern:*

Be it known that I, WILLIAM W. ROBINSON, a citizen of the United States, residing at Odebolt, in the county of Sac and State of Iowa, have invented certain new and useful Improvements in Harrows, of which the following is a full, clear, and exact description, reference being had to the accompanying drawings, forming part of this specification, in which—

Figure 1 represents a perspective view of a harrow embodying my improvements. Fig. 2 is a side elevation showing the teeth raised from the ground and the harrow supported upon its longitudinal draw-beams or runners. Fig. 3 represents enlarged views of one of the harrow-teeth, showing the manner of attaching the same to the beam.

This invention relates to harrows in which the teeth are carried by rocking beams under the control of a lever to change the angular position of the teeth relatively to the ground, and my present invention is an improvement on Letters Patent No. 308,433, granted to me November 25, 1884.

My invention consists in the peculiar construction of the several features constituting the harrow, and in the combination of devices which I shall hereinafter fully describe, and specifically point out in the claims.

To enable others skilled in the art to make and use my invention, I will proceed to describe the manner in which I have carried it out.

In the said drawings, the rocking beams A are composed of suitable metal ⊃-shaped in cross-section, and are provided with notches $a$, which form seats, against which the shanks of the teeth are tightly drawn, as I shall hereinafter describe.

The beams A may be of any desired number, arranged one in rear of the other, and are perforated at the front portions, at $b$, to receive bolts $c$, which pass through said beams and through the upper portions of suitable angular levers, B, the lower ends of which are pivotally secured to the longitudinal draw-beams or runners C C', which are designed to support the harrow when the teeth are thrown entirely out of the ground, thereby protecting said teeth from unnecessary wear or injury when passing over stony places, bridges, the roadway, or when the harrow is being transported to or from the field. In addition to the openings $b$, the beams are provided with another series of holes, $d$, through which project the shanks of suitable tightening-bolts D. These bolts are secured tightly to the beams by means of nuts or other securing devices engaging their shanks, and are provided with elongated slotted heads of a length and width sufficient to permit the introduction of the widest portion of the teeth. The bolts engage that portion of the shanks lying between the open rear ends of the U-shaped beams, and hold said teeth tightly to their seats in the notches $a$, thereby preventing said teeth from turning in their seats, or from being laterally displaced.

The working portions of the teeth E are of a flat construction, chamfered on their opposite edges, whereby said teeth, accordingly as they are turned or adjusted in their seats in the beams, may be made to present either a broad flat working-surface or a knife-edge in front, or, if desired, may be set to present an oblique working-face to suit different requirements of the soil or work to be done, and said teeth having oppositely-arranged knife-edges, it is manifest their working-surfaces may be changed or reversed, as required, thereby increasing the durability of the teeth. The shanks of the teeth are of a length sufficient to provide for the necessary vertical adjustment of said teeth, and they are provided with heads $e$, which prevent the teeth from becoming detached from the beam, even if they should work loose.

The longitudinal beams or draw-bars C C', as before described, are designed to serve as runners when the teeth are out of the ground and the device is being transported, and they are preferably three in number, the two outer ones, C, supporting the ends of the beams, and the center one being located at or near the longitudinal center of the harrow.

To the outer beams the angular levers B are pivotally secured, and to the central beam or draw-bar, C', is similarly secured the lower end of levers F, corresponding in form to the levers B, except that their upper ends are extended, and are pivotally attached to a longitudinal rocking bar, G, which is provided with a notched segment, H, adapted to be engaged by a lever, J, pivoted to the central draw-bar and rocking bar G, and with its outer end extending back of the rear beam, as shown, the lever being held to its adjustment by the usual spring-pawl mechanism.

From the foregoing description it is manifest the forward movement of the operating-lever J causes the rocking bar G and the levers F, to which the beams are attached, to turn upon the pivots of the latter, thereby presenting the teeth at any angle to the surface of the ground, or, if desired, raising the teeth entirely from their engagement with the same. This latter adjustment permits the draw-bars to come against the ground, thereby providing runners upon which the harrow may be transported to or from the field, over stony places, &c. The peculiar construction and mounting of the teeth also enables the operator to adjust said tooth from a sharp-edge tooth or a broad-surfaced tooth to any desired angle or to any width of tooth, this adjustment being readily accomplished by the tightening-eyebolts and the round shanks of the teeth, these teeth being readily inserted and removed from their engagement with the eyebolt by reason of the elongated slots formed in said bolts.

The essential object of the operating-lever shown in my former patent was to change the teeth from a straight-tooth harrow to a smoothing-harrow. The present construction not only accomplishes this feature, but also sets the teeth forward at any angle, and also throws the said teeth backward and entirely out of the ground.

Having thus described my invention, what I claim as new, and desire to secure by Letters Patent, is—

1. The combination, with the harrow-beams A, having notches $a$ formed therein, of the teeth having round extended shanks, which engage the notches and permit the teeth to be turned at any angle, and the tightening-eyebolts having elongated slots formed in their heads for the insertion and removal of the teeth, substantially as herein described.

2. In a harrow, the main beams ⊃-shaped in cross-section, and having curved notches $a$ and openings $b$ and $d$ formed therein, in combination with the teeth E, adapted to be turned at any angle, and having extended rounded shanks with heads $e$ formed thereon, the tightening-eyebolts D, having elongated slotted heads for the passage of the teeth and shanks, which pass through the openings $d$ in the beams, and suitable securing-nuts, whereby the teeth are rigidly held within the notches, substantially as herein described.

3. In a harrow, the combination of the main beams having openings and notches formed therein, the longitudinal draw-beams or runners C C' at the ends and center of the beams, the angular levers B and F, to which they are pivoted, the bolts $c$, for securing the levers to the main beams, a rocking bar, G, at the center of the beams and pivoted to the extended ends of the levers F, a segment, H, carried by said beam, an operating-lever, J, for depressing the bar to raise the teeth, the harrow-teeth E, having extended shanks with heads $e$ formed thereon, and the slotted tightening-eyebolts D, engaging the shanks and passing through the openings in the main beams, and the securing-nuts, substantially as herein described.

WILLIAM W. ROBINSON.

Witnesses:
J. E. McPHERRAN,
BENJAMIN DELWORTH.